Patented Aug. 12, 1952

2,606,926

UNITED STATES PATENT OFFICE 2,606,926

PROCESS FOR PREPARING CYCLOHEXANE-DIAMINES PREDOMINANTLY IN THE CIS FORM

James E. Kirby, Wilmington, Del., assignor to E. I. du Pont de Nemours & Company, Wilmington, Del., a corporation of Delaware No Drawing. Application December 31, 1949, Serial No. 136,421

8 Claims. (Cl. 260—563)

This invention relates to a process for the preparation of alicyclic diamines useful as intermediates for anti-malarial organic chemicals. More particularly it relates to a catalytic process for the hydrogenation of certain N-substituted aromatic amines to the corresponding cyclohexanediamines.

This application is a continuation-in-part of my copending application Serial No. 651,987, filed March 4, 1946.

Although the hydrogenation of aniline and its homologues to the corresponding cyclohexylamines has heretofore been accomplished catalytically at high temperatures, no catalyst is known for low temperature ring hydrogenation of aromatic compounds having more than one basic group to the corresponding N-substituted cyclohexanediamines and particularly the cis form of these alicyclic diamines.

This invention has as an object a process for preparing cyclohexanediamines wherein one of the amino groups is primary and the other is secondary or tertiary being attached, in addition to the cyclohexane nucleus, to one or to two aliphatic carbon atoms. A further object is a low temperature process for preparing these diamines. Another object is the preparation of these diamines largely in the cis form. Still another object is the provision of a new process for the hydrogenation of nitroxyanilines, i. e., nitro- and nitrosoanilines, in one operation to the corresponding unsymmetrical N-substituted cyclohexanediamines. Other objects will appear hereinafter.

These objects are accomplished by the present invention wherein cyclohexanediamines in which one of the amine groups is primary and the other, being attached, in addition to the cyclohexane nucleus, to one to two aliphatic carbon atoms, is secondary or tertiary, are prepared by reacting with hydrogen, in the presence of a ruthenium hydrogenation catalyst, a benzenoid compound having two nitrogen atoms each directly joined to the benzene nucleus, one of said nitrogen atoms being attached to aliphatic carbon by at least one valence, and the other to hydrogen or oxygen only.

The benzenoid compounds hydrogenated by the process of this invention are of the type,

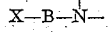

wherein B is a mononuclear arylene radical, i. e., mononuclear bivalent aromatic hydrocarbon radical having its free valences stemming from annular, or nuclear carbons, X is a nitro, nitroso, or primary amino group, and at least one of the remaining valences of N, which is secondary or tertiary amino nitrogen, is satisfied by non-aromatic carbon, i. e., a carbon atom which is not part of an aromatic ring. One embodiment of such structures is that in which the two remaining valences of the nitrogen are satisfied by aliphatic carbons which form a part of one and the same aliphatic heterocyclic ring.

In the preferred practice of the invention, the benzenoid compound of the above type, in a fluid condition, is brought into contact with hydrogen, under superatmospheric pressure within the range of from 30 to 200 atmospheres and at a temperature within the range of from 60° C. to 200° C., with a ruthenium catalyst which is present in an amount within the range of from 0.1 to 5% of the weight of the benzenoid compound.

The following examples, in which parts are by weight unless otherwise indicated, illustrate the invention.

Example I

A mixture of 215 parts of p-aminodiethylaniline, 200 parts of dioxane, and 11 parts of finely divided ruthenium dioxide catalyst is placed in a pressure vessel and shaken under 100–167 atmospheres of hydrogen pressure, the temperature then being raised to 100° C. Under these conditions, hydrogen is absorbed smoothly for two hours, the amount absorbed corresponding to that necessary for the formation of the cyclohexanediamine. The reactor is then discharged, washed with 100 parts of methanol, and the washings added to the hydrogenated product. The combined reaction product and washings are treated with five parts of decolorizing agent (bone black) for one-half hour at room temperature, the catalyst and decolorizing agent then being removed by filtration. On distillation of the filtrate, 156 parts of N,N-diethyl-1,4-cyclohexanediamine, a colorless, oily material boiling at 66° C./1 mm., is obtained. Titration of this product in aqueous solution with 0.1 N hydrochloric acid and methyl red indicator shows it to have neutral equivalents of 86.5 and 86.8 as compared with the calculated value of 85.2.

Example II

By the procedure of Example I, a mixture of 125 parts of p-amino-di-n-butylaniline, 50 parts of dioxane and 5 parts of finely divided ruthenium dioxide catalyst is hydrogenated at 100° C. under 133–167 atmospheres of hydrogen pressure. Two such runs are combined and the catalyst removed by filtration. Distillation of the filtrate yields 39 parts of colorless, oily N,N-di-n-butyl-1,4-cyclohexanediamine, B. P. 92–95° C./0.5 mm.; $N_D^{25}=1.4712$.

Analysis—
Calculated for $C_{14}H_{30}N_2$: C, 74.2%; H, 13.4%.
Found: C, 74.3%, 74.8%; H, 13.2%, 13.4%.

*Example III*

A solution of 90 parts of m-aminodiethylaniline in 100 parts of dioxane having suspended therein 4.5 parts of finely divided ruthenium dioxide catalyst is reduced in accordance with Example I at 100° C. under 133–200 atmospheres of hydrogen pressure until hydrogen absorption ceases. Removal of the catalyst by filtration and distillation of the filtrate gives 26 parts of colorless, oily N,N-diethyl-1,3-cyclohexanediamine, B. P. 68–69° C./1 mm. This product on titration as in Example I, shows neutral equivalents of 86.1 and 86.2 as compared with the calculated value of 85.2.

*Example IV*

A mixture of 90 parts of p-nitrosodiethylaniline, 90 parts of dioxane, and 5 parts of finely divided ruthenium dioxide catalyst is placed in a pressure reactor and shaken under 33–66 atmospheres' hydrogen pressure. After about 1½ hours at 80° C. under this pressure, hydrogen in amount corresponding to that for formation of p-aminodiethylaniline is absorbed. Without opening the reactor or otherwise interrupting the process, the temperature is then raised to 110° C. and the hydrogen pressure increased to 67 to 135 atmospheres, under which conditions ring hydrogenation takes place and is substantially complete after about two hours. The reaction mixture is then discharged and allowed to stand at room temperature with 5 parts of decolorizing agent (bone black) for one hour, after which it is filtered and distilled, 53.7 parts of N,N-diethyl-1,4-cyclohexanediamine boiling at 94–95° C./7 mm. being thus obtained.

*Example V*

A pressure reactor equipped with a shaker mechanism is charged with 40 parts of p-nitrodiethylaniline, 110 parts of dioxane, and 2 parts of finely divided ruthenium dioxide catalyst, after which it is sealed and hydrogen introduced until the pressure reaches approximately 100 atmospheres. The reactor is then heated with shaking to 80° C., at which temperature hydrogenation of the nitro group to a primary amino group proceeds rapidly. After three hours under these conditions, considerable ring hydrogenation also takes place. To complete the latter hydrogenation, the temperature is raised to 120° C. and the hydrogen pressure to 167 atmospheres without interrupting the process, these conditions being maintained for an additional 1½ hours, after which hydrogenation essentially ceases. Upon filtration and distillation of the resulting reaction product, 25 parts of N,N-diethyl-1,4-cyclohexanediamine, B. P. 96–101° C./8 mm., is obtained.

*Example VI*

A mixture of 100 parts of p-nitromonoethylaniline, 75 parts of dioxane, and 5 parts of finely divided ruthenium dioxide catalyst is hydrogenated first at 80° C. under 33–100 atmospheres of hydrogen pressure until hydrogen absorption is substantially complete. Without interrupting the process, hydrogenation is then continued by increasing the temperature to 100° C. and the hydrogen pressure to 100–167 atmospheres, these conditions being maintained until no further hydrogen absorption is observed. The hydrogenated reaction products from two such runs are combined and worked up as in Example V to yield 98 parts of colorless, oily N-ethyl-1,4-cyclohexanediamine, B. P. 85° C./8 mm.; $N_D^{25}=1.4767$.

Analysis—
Calculated for $C_8H_{18}N_2$: C, 67.5%; H, 12.8%; N, 19.7%.
Found: C, 67.5%; H, 13.0%; N, 19.8%.

*Example VII*

Using the same procedure as described in Example VI, p-nitromonoisopropylaniline is hydrogenated in 43 per cent yield to colorless, oily N-isopropyl-1,4-cyclohexanediamine, B. P. 90–92° C./10 mm.; $N_D^{25}=1.4726$.

Analysis—
Calculated for $C_9H_{20}N_2$: C, 69.2%; H, 12.9%; neutral equivalent, 78.1.
Found: C, 69.5%, 69.4%; H, 13.0%, 12.9%; neutral equivalent, 77.7, 77.5.

*Example VIII*

A pressure reactor equipped with a shaker mechanism is charged with 116 parts of N-(p-nitrophenyl)piperidine, 75 parts of dioxane and 6 parts of finely divided ruthenium dioxide catalyst after which it is sealed and hydrogen introduced until the pressure reaches about 33 atmospheres. The reactor is heated with shaking to 80° C. at which temperature hydrogenation of the nitro group proceeds. After three hours at this temperature and a hydrogen pressure of 33–100 atmospheres appreciable ring hydrogenation takes place. To complete ring hydrogenation, the temperature is raised to 100° C. and the hydrogen pressure to 133–167 atmospheres without interrupting the process, these conditions being maintained until hydrogen absorption ceases. The reaction product is worked up as in Example VI giving 44.6 parts of colorless, oily 4-(1-piperidyl)-cyclohexylamine, B. P. 108.5–109° C./4 mm.; $N_D^{25}=1.5003$. Titration of this product as described in Example I shows neutral equivalents of 91.6 and 92.6 as compared with the calculated value of 91.2.

*Example IX*

With the same equipment and using the general procedure described in Example VIII, a mixture of 105 parts of N-(p-nitrophenyl)-morpholine, 75 parts of dioxane and 5 parts of finely divided ruthenium dioxide catalyst is hydrogenated first at 110° C. under 33–100 atmospheres of hydrogen pressure. After hydrogen absorption is substantially complete under these conditions, the temperature is raised to 175° C. and the hydrogen pressure to 133–167 atmospheres, under which conditions the reaction is continued until hydrogenation essentially ceases. The reaction products from three such runs as just described are combined and the catalyst removed by filtration. Distillation of the filtrate yields 97.3 parts of colorless, oily 4-(4-morpholinyl)-cyclohexylamine, B. P. 116–117.5° C./3 mm.; $N_D^{25} = 1.5038$.

Analysis—
Calculated for $C_{10}H_{20}ON_2$: C, 65.4%; H, 10.9%; neutral equivalent, 92.2.
Found: C, 66.0%, 66.3%; H, 11.2%, 11.1%; neutral equivalent, 93.0, 93.5.

Although the invention has been illustrated with the foregoing specific examples, it is generically applicable to any aromatic amine having on the benzene ring an amino nitrogen having at least one of its remaining valences joined to non-aromatic carbon, any remaining valence being satisfied by hydrogen, said benzene ring having as a further substituent a nitrogen atom joined to hydrogen or to oxygen and satisfying all valences of said elements, i. e., to any aromatic amine having, separated by a mononuclear arylene radical, two groups, one a secondary or tertiary amino group which is non-aromatic, i. e., contains only carbons of aliphatic character and the other a group having nitrogen bonded to the arylene radical, the remaining valences of said nitrogen being satisfied by and completely satisfying hydrogen or oxygen. It is thus also applicable to N-isobutyl, N-isoamyl, N-benzyl, and N-cyclohexyl-p-phenylenediamines; N,N-di-n-propyl, N-(n-butyl)-N-benzyl, and N,N-dibenzyl-p-phenylenediamines; N-ethyl-m-phenylenediamine; N-ethyl and N,N-dimethyl-o-phenylenediamines; N-methyl-o-nitroaniline, N,N-dimethyl-o-nitroaniline, N,N-diethyl-5-nitro-o-toluidine, N-(n-butyl)-o-nitro-p-toluidine, N-methyl-N-n-propyl-p-nitrosoaniline, N,N-di-n-propyl-p-nitrosoaniline; and compounds in which one of the nitrogens attached to the benzene ring is a part of an aliphatic heterocyclic ring, e. g., N-(p-aminophenyl)-piperidine. Particularly preferred are those compounds wherein any substituent other than hydrogen on the one nitrogen is a lower alkyl group, i. e., an alkyl group of one to five carbons, the other nitrogen is attached to hydrogen or oxygen and satisfies all valences thereof, and the two said nitrogens are joined by an arylene, i. e., a bivalent aromatic hydrocarbon, radical of six to seven carbons, i. e., phenylene or tolylene.

The invention has been illustrated with particular reference to the use of ruthenium oxide as catalyst. It is to be understood, however, that the invention is generically applicable to the use of ruthenium in any catalytically active form. Examples of ruthenium catalysts which can be employed in this invention include elementary ruthenium, ruthenium salts and ruthenium oxides, e. g., ruthenium sesquioxide, ruthenium dioxide, and ruthenium tetroxide; perruthenites, e. g., barium perruthenite, and sodium perruthenite; ruthenates, e. g., potassium, sodium, silver, barium, strontium, calcium and magnesium ruthenates; perruthenates, e. g., potassium and sodium perruthenates; ruthenium halides, e. g., ruthenium pentafluoride, ruthenium dichloride, ruthenium trichloride and ruthenium tetrachloride; ruthenium sulfides, e. g., ruthenium disulfide and ruthenium trisulfide; ruthenium sulfate; ruthenium chlorosalts, e. g., potassium chloroperruthenate; and the like.

Although in the foregoing examples certain specific conditions of temperature, pressure, reaction periods, catalysts, reactants, reactant concentrations, and catalyst concentrations have been employed, it is to be understood that these factors are subject to considerable variation within the scope of this invention. The conditions for each hydrogenation reaction will vary somewhat and each is determined to a large extent by the particular compound being treated and by the properties desired in the resulting products.

For example, the N-substituted cyclohexanediamines, because of their structural configuration, can exist in two or more stereoisomeric forms. The ratio of these stereoisomers in any given sample of cycloaliphatic diamine can, to an appreciable extent be controlled by the proper choice of reaction conditions, particularly temperature, during hydrogenation. The use of low temperatures, i. e., 100° C. to 125° C., favors formation of a product containing a preponderance of one isomer considered to be the cis form. On the other hand, production of a product containing a preponderance of the other stereoisomers, e. g., the trans or dl-trans forms, is favored by the use of relatively high temperatures, i. e., above 150° C., but below 250° C. Thus, if it is desired to produce cyclohexanediamines predominantly in the cis form, temperatures below 150° C. and preferably 100 to 125° C. are employed, whereas, with the higher temperatures, and also increased contact time, other stereoisomeric forms can be obtained.

The amount of ruthenium catalyst employed will usually vary within the range of from 0.001% to 5% or more of the weight of the aromatic amine being hydrogenated, the exact percentage being controlled to a large extent by the economy of catalyst and time desired. At higher temperatures, substantial reduction of the aromatic amine can be achieved, particularly with a supported catalyst, when as little as 0.001% catalyst is employed. In general, good results are obtained with 0.01 to 1% catalyst based on the weight of the aromatic amine being hydrogenated. For relatively low temperature operation, e. g., at a temperature within the range of 60 to 130° C. it is preferred to use an amount of catalyst which is at least 0.5% of the weight of the aromatic amine.

Optimum results are obtained when the ruthenium catalyst is used in finely divided state. When it is desired to use very low catalyst concentrations, it is advisable to employ the ruthenium catalyst supported on a carrier, e. g., charcoal, kieselguhr, silica gel, alumina and the like. Such supported catalysts may be prepared by the method disclosed in U. S. 2,079,404 or by other methods involving reduction of an appropriate compound of ruthenium in the presence of a carrier substance.

In general, the process of this invention is operative at temperatures from 20° C. up to 250° C., while the optimum results are ordinarily obtained within the range of from 60° C. to 200° C.

Although the process is operative at atmospheric pressure, generally pressures of at least 10 atmospheres are used. The upper pressure limit is determined by the structural limitations of the equipment employed. Generally it is preferable to operate the process within the range of from 30–200 atmospheres, since ordinarily under these conditions, optimum results are obtained.

The process of this invention may be effected while the aromatic amine, subjected to hydrogenation, is in solid form. Substantially improved reduction is obtained, however, when said aromatic amine is in a fluid condition, i. e., is either a liquid, dissolved in an inert liquid solvent, or in the form of a vapor. With high melting aromatic amines, best results are usually obtained by operating the process in the presence of an inert liquid organic medium, preferably one in which the aromatic amine is soluble. In certain cases where the reaction is exothermic, the use of such reaction medium permits suitable control of the reaction which would not otherwise be possible without such diluent. Included among examples of operative organic media are alcohols, e. g., methanol, ethanol, propanol and isopropanol; ethers, e. g., dioxane; and hydrocarbons, e. g., cyclohexane.

The process of this invention offers many advantages since it provides a catalyst, ruthenium, which is selective for the conversion in one operation of certain N-substituted aromatic amines, especially the nitroso- and nitroanilines having aliphatic substituents on the anilino nitrogen atom, to the corresponding N-substituted cyclohexanediamines in relatively high yields with a minimum of side reaction products. Furthermore, in providing a hydrogenation process operable at low temperatures, this process offers the advantage of favoring the formation of the stereoisomeric form of N-substituted cyclohexanediamines not otherwise obtainable in satisfactory yields when hydrogenation is effected only at higher temperatures.

The products of this invention are especially useful for the preparation of antimalarials and other pharmaceuticals. They are also useful as acid inhibitors, insecticides, bactericides, and as intermediates for the preparation of surface-active agents, corrosion inhibitors, and rubber chemicals and, in certain cases, for polyamides. The cyclohexanediamines having the two amino groups in the 1,4 position are particularly useful as antimalarial intermediates.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In a process for the preparation of cyclohexanediamines predominantly in the cis form, the improvement which comprises reacting, as the sole reactants, in contact with a hydrogenation catalyst containing ruthenium as the essential catalytic component, hydrogen at a temperature of 60 to 125° C. under a pressure of 30 to 200 atmospheres and an arylene compound of 6 to 7 carbon atoms and having directly connected to the arylene ring a nitrogen which is attached to from one to two alkyl groups each containing from one to five carbon atoms with any remaining valence of said nitrogen being satisfied by hydrogen, and also having directly connected to said arylene ring a member of the class consisting of primary amino, nitro and nitroso groups, said ruthenium hydrogenation catalyst being present in amount of at least 0.5% of the weight of the amino compound hydrogenated.

2. In a process for the preparation of cyclohexanediamines, predominantly in the cis form, the improvement which comprises reacting, as the sole reactants, in contact with a hydrogenation catalyst containing ruthenium as the essential catalytic component, hydrogen at a temperature of 60 to 125° C. under a pressure of 30 to 200 atmospheres and a dialkylaminobenzene in which each alkyl group contains from one to five carbon atoms and having one ring substituent other than the dialkylamino group and that a member of the group consisting of primary amino, nitro and nitroso groups, said ruthenium hydrogenation catalyst being present in amount of at least 0.5% of the weight of the amino compound hydrogenated.

3. In a process for the preparation of cyclohexanediamines predominantly in the cis form, the improvement which comprises reacting, as the sole reactants, in contact with a hydrogenation catalyst containing ruthenium as the essential catalytic component, hydrogen at a temperature of 60 to 125° C. under a pressure of 30 to 200 atmospheres, and an alkylamino benzene in which the alkyl group contains from one to five carbon atoms and having one ring substituent other than the alkylamino group and that a member of the class consisting of primary amino, nitro and nitroso groups, said ruthenium hydrogenation catalyst being present in amount of at least 0.5% of the weight of the amino compound hydrogenated.

4. In a process for the preparation of cyclohexanediamines predominantly in the cis form the improvement which comprises reacting, as the sole reactants in contact with a ruthenium oxide hydrogenation catalyst, hydrogen at a temperature of 100 to 125° C. under a pressure of 30 to 200 atmospheres, and a dialkylamino nitrobenzene, the alkyl groups of which contain from one to five carbons, said ruthenium oxide hydrogenation catalyst being present in amount of at least 0.5% of the weight of the amino compound hydrogenated.

5. In a process for the preparation of N,N-diethyl-1,4-cyclohexanediamine predominantly in the cis form, the improvement which comprises reacting, as the sole reactants, in contact with a ruthenium oxide hydrogenation catalyst, hydrogen at a temperature of 100 to 125° C. under a pressure of 30 to 200 atmospheres, and p-nitrodiethylaniline, said ruthenium oxide hydrogenation catalyst being present in amount of at least 0.5% of the weight of the amino compound hydrogenated.

6. In a process for the preparation of cyclohexanediamine predominantly in the cis form, the improvement which comprises reacting, as the sole reactants, in contact with a ruthenium oxide hydrogenation catalyst, hydrogen at a temperature of 100 to 125° C. under a pressure of 30 to 200 atmospheres, and an alkylaminoaniline in which the alkyl group contains from one to five carbon atoms, said ruthenium oxide hydrogenation catalyst being present in amount of at least 0.5% of the weight of the amino compound hydrogenated.

7. In a process for the preparation of N,N-diethyl-1,4-cyclohexanediamine predominantly in the cis form, the improvement which comprises reacting, as the sole reactants, in contact with a ruthenium oxide hydrogenation catalyst, hydrogen at a temperature of 100 to 125° C. under a pressure of 30 to 200 atmospheres, and p-aminodiethylaniline, said ruthenium oxide hydrogenation catalyst being present in amount of at least 0.5% of the weight of the amino compound hydrogenated.

8. In a process for the preparation of N-isopropyl-1,4-cyclohexanediamine predominantly in the cis form, the improvement which comprises reacting, as the sole reactants, in contact with a ruthenium oxide hydrogenation catalyst, hydrogen at a temperature of 100 to 125° C. under a pressure of 30 to 200 atmospheres, and p-nitromonoisopropylaniline, said ruthenium oxide hydrogenation catalyst being present in amount of at least 0.5% of the weight of the amino compound hydrogenated.

JAMES E. KIRBY.

REFERENCES CITED

The following references are of record in the file of this patent:

UNITED STATES PATENTS

| Number | Name | Date |
|---|---|---|
| 1,907,820 | Jaeger | May 9, 1933 |
| 2,132,389 | Bertsch | Oct. 11, 1938 |
| 2,494,563 | Kirk et al. | Jan. 17, 1950 |

FOREIGN PATENTS

| Number | Country | Date |
|---|---|---|
| 838,597 | France | Mar. 9, 1939 |
| 56,448 | Netherlands | June 15, 1944 |

OTHER REFERENCES

Behr et al.: J. A. C. S., vol. 68, pp. 1296–1297, 1946.

Skita et al.: Berichte, vol. 52, p. 1534, 1919.